United States Patent [19]

Langer

[11] Patent Number: 4,862,737

[45] Date of Patent: Sep. 5, 1989

[54] ROADWAY LOADING SIMULATOR

[75] Inventor: William J. Langer, Eden Prairie, Minn.

[73] Assignee: MTS Systems Corporation, Eden Prairie, Minn.

[21] Appl. No.: 284,904

[22] Filed: Dec. 15, 1988

[51] Int. Cl.[4] .............................................. G01L 5/28
[52] U.S. Cl. ........................................ 73/117; 73/126
[58] Field of Search .................. 73/12, 117, 669, 670, 73/865.6, 126

[56] References Cited

U.S. PATENT DOCUMENTS 4,238,954 12/1980 Langer ................................... 73/146
4,455,866 6/1984 Barrigar ................................. 73/117

OTHER PUBLICATIONS

A Dynamometer on which the Dynamic Behaviour of a Passenger Car can be Simulated, by Jean Odier, published in Proc Instn Mech Engrs, vol. 186, 1972.
Road-Holding: Braking and Traction, Paper 700367, New York, Society of Automotive Engineers, Inc., 1970.
Indoor Vehicle Braking Simulation: Correlation and Comparison with Road Testing, Paper 730,562, New York: Society of Automotive Engineers, Inc., 1973.
The Road Simulation Rig, Valeo Publisher.

Primary Examiner—Stewart J. Levy
Assistant Examiner—Michele Simons
Attorney, Agent, or Firm—Kinney & Lange

[57] ABSTRACT

A vehicle restraint system for testing vehicles has vehicle restraint linkages which couple to a vehicle mounted on a simulated roadway to provide restraint in selected axes and to permit freedom of movement in other axes in a manner that permits the automobile to react as it would when being driven over an actual roadway. The restraint system is made to combine and limit lateral, longitudinal and yaw motions with a minimum effect on the handling properties in other axes of movement. The restraint system includes selective, active servo positioning in the restrained axes so that the position of the vehicle can be maintained so that the vehicle tires are kept within a load support area of the simulated roadway without substantially affecting the vehicle handling properties. The linkages used are operated through actuators that can also be used as passive restraints, that is, providing a spring force to maintain the vehicle in a desired location. The action of the restraint linkages is through the center of gravity of the vehicle. The three restrained axes are decoupled from each other so that the restraint in each axis does not substantially affect the other axes. Precise simulation of effects on a vehicle of a roadway can thus be obtained.

9 Claims, 4 Drawing Sheets

ROADWAY LOADING SIMULATOR

BACKGROUND OF THE INVENTION

1. Field of the Invention

The present invention relates to a vehicle restraint system that limits lateral, longitudinal and yaw motions of a test vehicle on a simulated roadway, without substantially affecting handling properties of the vehicle.

2. Description of the Prior Art

In the prior art, simulated roadways and restraint systems for holding vehicles in position on such roadways have been advanced. A restraint system for use on conventional roller dynamometers is described in an article entitled "A Dynamometer On Which The Dynamic Behaviour Of A Passenger Car Can Be Simulated" by Jean Odier, published in Proc Instn Mech Engrs Vol 186, 1972, which describes a restraint for holding a vehicle in position on four independent, power driven roller dynamometers. The vehicle is restrained with a large cradle.

The linkage used required pivoting arms and actuators on both sides of the vehicle, with a single frame underneath the vehicle. In order to permit the necessary degrees of freedom, the linkages on opposite sides of the vehicle have to permit movement along and rotation about a vertical axis, they have to permit yaw motion, and also they have to permit lateral movement, which the restraint shown required system of horizontal slides for supporting the linkage. The linkage and frame takes substantial room, and because of the positioning of the main loading joints, called "spherical knee joints" in the article, and the fact that these joints provided all of the loading to the vehicle, there was a likelihood of "crosstalk" between loads in the various axes of interest.

Further, as pointed out in the article, there was a need for having sliding components, which are prone to high friction loads. Maintaining very low friction coefficients was essential to proper operation. The longitudinal restraint system in this prior art device was made so side loads and yaw could be simulated, but again it involved operating through a linkage that affected loading in other axes.

The same author, Jean Odier, has published additional papers in relation to the restraint device, including an analysis of braking system characteristics, in an article entitled "Road-Holding: Braking and Traction", Paper 700367, New York: Society of Automotive engineers, Inc., 1970, and an article entitled "Indoor Vehicle Braking Simulation: Correlation and Comparison with Road Testing", Paper 730,562, New York: Society of Automotive Enginners, Inc., 1973.

The vehicle restraint system shown in the first-mentioned article is also illustrated in a brochure from the French Farodo Group. It can be seen in the illustrations in such brochure that the prior restraint device requires a substantial amount of space, with space for access from both sides of the vehicle being required.

SUMMARY OF THE INVENTION

The present invention relates to a vehicle restraint system for a vehicle mounted on a fixed vehicle dynamometer to provide three degrees of restraint and three degrees of freedom in a manner that provides realistic simulation of forces on the vehicle, chassis, power train, and a driver. The vehicle is restrained from lateral, longitudinal and yaw motions within a set travel distance. The vehicle wheels will be driven by individual powered roadway systems on each of the four wheels. Actual road operational forces can be simulated by controlled external forces from the roadway systems. The three degrees of freedom that are unrestrained are vertical, pitch, and roll motions. Instrumentation on the vehicle will provide information about vehicle response in the unrestrained axes when roadway forces cause loads in those axes.

The restraint system comprises a series of linkages positioned on one side of the vehicle and coupled to the vehicle. The linkages are controlled by actuators that can be selectively hydraulically operated for active position control and restraint of the vehicle or the actuators are converted into gas springs by coupling the opposite sides of the actuator cylinder and piston to two adjustable pressure gas volumes to provide a spring load restraint between stops or limits of travel. The gas volumes can be adjusted in pressure to change the spring rate or stiffening action. The range of movement of the gas spring cylinders can be changed as well to control the position of the vehicle on the individual roadways in the three restraint axes.

When the restraint system is in active hydraulic control, the vehicle can be held in a constant position if desired, or can be shifted and moved relative to the roadways. Transient motions can be applied on a given axis of restraint in order to simulate the effects of wind gusts from a passing truck for example. The roadways can be controlled as well, to simulate acceleration, steering and other forces on a vehicle.

The restraint mechanism consists of four bar linkage mechanisms coupled to the vehicle such that restraint at an effective point is equivalent to the vehicle center of gravity for each of the lateral, longitudinal yaw motions. The center of effort for restraining load is maintained at the vehicle center of gravity at all times. The four bar linkages insure that the restraint action remains the same on the vehicle without causing cross-talk between the axes of restraint as the vehicle moves across its permissible range of motion. Additionally, servovalves controlling the actuators for the linkages can hold the vehicle's position longitudinally for example, while allowing freedom in the lateral and yaw directions because the restraints are independent of each other.

The roadway systems are made of four independent belt-type roadways such as the roadway frame and belt shown in U.S. Pat. No. 4,238,954 These roadway belts can be driven at variable speeds, and can be mounted so that they can be steered, and controlled for acceleration and deceleration to simulate various loads on the vehicle. The main limitation for this type of restraint and loading through a simulated roadway is in regard to low frequency accelerations. On an actual road, the vehicle has a large space within which to move and experience very low frequency and even zero frequency acceleration. A simulated roadway has a much smaller space available, but the present restraint system can be controlled to act as a high pass filter on vehicle acceleration. Within the displacement limits of the roadway, vehicle accelerations for a period of approximately one second or less may be achieved before the travel limits are encountered. The longer period accelerations are limited by the roadway width and length, and by the restraint system limits as well, so that a driver and all objects within a vehicle will not experience accelerations with a period greater than approximately one second. The vehicle power train, chassis and suspension still may be made to experience loads of longer periods with proper programming of the roadway drive motors and the roadway yaw (steer) control.

The levers provided on the restraint system provide a loading ratio, and, as shown, cantilever arms are utilized so that only a small fraction of the restraint system mass is reacted at the vehicle. This means that the restraint system does not noticeably affect the accelerations of the vehicle. The linkages for the restraint system are adjusted vertically to coincide at the height of the vehicle center of gravity, and the restraint system does not have to move horizontally on the floor, so no friction producing slides are necessary. The roadway belts or roadways can be adjusted so that once the vehicle is positioned in the center location of the loading linkages, the roadways can be moved to position underneath the wheels of the vehicle so that the vehicle is nominally started at a linkage centered position. The linkages are connected to the vehicle body. The wheels, axles and spring suspension act in a realistic manner as the roadways are powered.

The linkage provides maximum flexibility and test configurations, while minimizing the effect of the linkage itself on determinations of vehicle handling characteristics.

DETAILED DESCRIPTION OF THE PREFERRED EMBODIMENTS

A vehicle testing system for testing vehicle road handling performance is shown generally at 10. The test apparatus is shown schematically, and includes four separate independent belt type roadways indicated generally at 12 which are mounted with respect to a building or support in a desired manner, such as that disclosed by the prior art. The belt type roadways are conventional and include individual controllable motors indicated at 14 which drive one of a pair of drums indicated generally at 15 for each roadway. The drums 15 are spaced apart and a belt 16 is mounted over the drums and is driven by the motor 14 rotating one of the drums. The drums are mounted on a framework indicated generally at 17 which can be steered about an upright axis, that is, an axis perpendicular to the axis of rotation of the drum, and also perpendicular to the generally flat roadway surface indicated at 18 that is formed by the top length of the belt 16. The steer apparatus 20 can be any desired type of apparatus, and is shown only schematically, as is the roadway support frame 7.

A vehicle 21 which is to be tested includes a body portion, and axles and wheels that carry the body on spring supports are shown generally at 22. The vehicle has front wheels 23, rear wheels 24, a body 25, and support arms or axles to which the wheels 23 and 24 are attached so that the spring supported body or load is supported as in actual road use. The wheels have tires mounted thereon as in actual use.

In testing, the roadway belts 16 are run at variable lineal speeds so that the roadway surface 18 is traveling underneath the wheels 23 and 24, by driving the motors 14, so the wheels 23 and 24 will rotate. The wheels can be mounted so that they will drive through the transmission and gear drive if desired.

A vehicle restraint system indicated generally at 30 is used for restraining the vehicle 21 in desired axes, while permitting free movement in other axes so that the vehicle loading during road travel is simulated closely. The restraint system 30 can restrain or control the vehicle 21 in lateral movement, longitudinal movement, and yaw or steering movement. Yaw is a movement about a vertical axis extending through the center of gravity. Longitudinal motion is along the fore and aft axis of the vehicle 21, which is parallel to the direction of the travel of the road surfaces 18. Lateral movement is movement at an axis perpendicular to the longitudinal axis or in other words transverse to the vehicle 21 and thus generally in the direction of the axes of rotation of the roadway belt support rollers. Complete (unrestrained) freedom of movement is permitted in vertical direction, that is, perpendicular to the simulated roadway surfaces 18. The vehicle 21 can also freely move in pitch, which is rotational motion about the lateral axis, and can roll, which is the tendency of the vehicle to roll from side to side about the longitudinal axis.

The restraint system of links for each of the three restrained motions are decoupled from each other, that is, there is no substantial "cross-talk" of loads. The restraints can be mounted onto a common test stand base that is indicated generally at 32. The mountings also could be mounted independently. For example, the longitudinal restraint linkage could be mounted at the forward end of the vehicle 21 as opposed to the rear end, which is shown herein.

Several cascaded four bar linkages or parallelogram linkages are used for restraining the vehicle 21 so that the motions or forces in the restrained or controlled axes are decoupled from each other, as are the motions in the unrestrained axes. Spherical joints are used in all connections, to permit free movement with respective links as will be explained.

Figure 3:
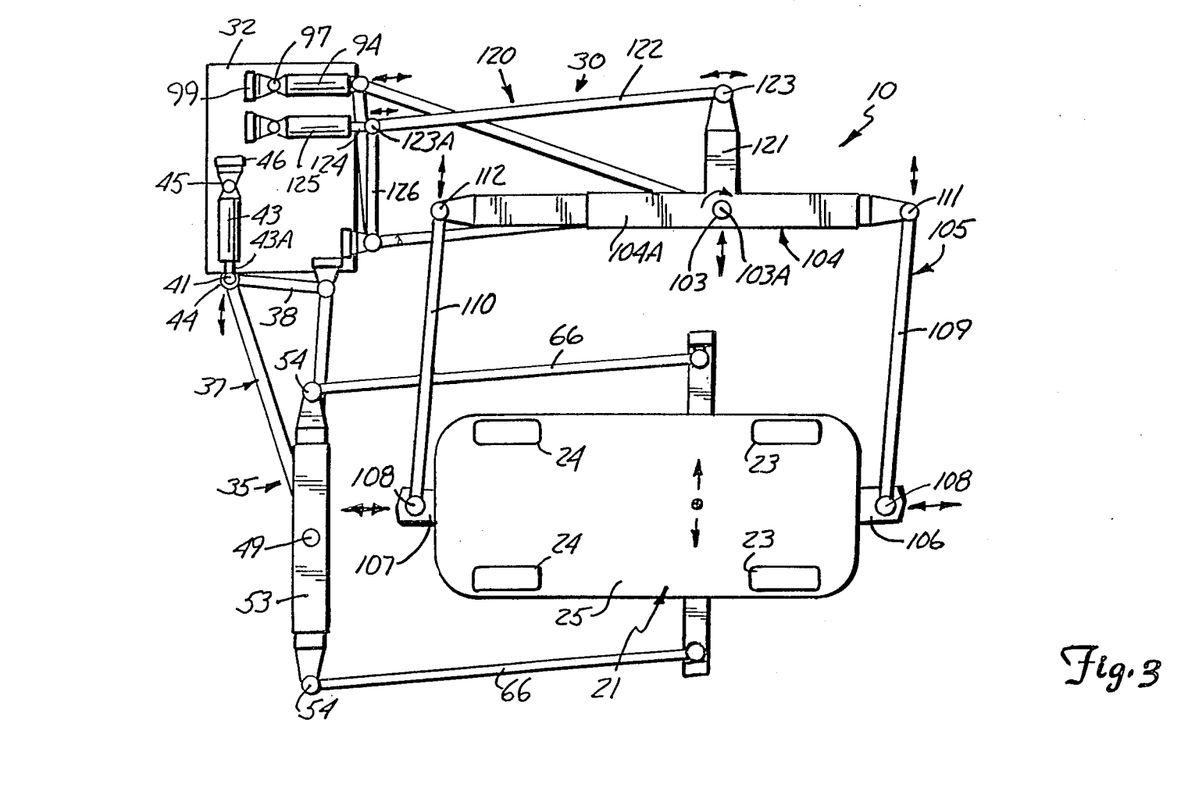
FIG. 3 is a schematic top plan view of a restraint system made according to the present invention.

Restraint in the longitudinal direction is provided by a linkage indicated generally at 35, which, at the support plate 32 comprises an upright pivot pedestal or column 36, to which a framework type bell crank 37 is pivotally mounted. The bell crank 37 is made up of several stringers 38 which are mounted onto a hub 39 that pivots on the column 36. The bell crank 37 has a drive pivot connection 40 at an axis of pin 41 connecting upper and lower links 38, and a control actuator 43 has its rod end 44 pivotally connected to pin 41. The actuator 43 is shown schematically, but includes an internal piston, and an outer cylinder housing, and an extendable and retractable rod 43A (FIG. 3).

The actuator 43 is made so that it can be used as a servo-controlled hydraulic actuator, or the actuator can be connected to pressure accumulators which load the piston on a gas over hydraulic system, causing the actuator to act as a gas spring. In other words, the piston can be driven by servo valve controls which positively control displacement of the rod 43A, and when connected as a gas spring with accumulators at opposite sides of the piston, the rod then will retract and extend in response to external forces that are acting to compress the compressible gas in the accumulators.

The outer cylinder of the actuator 43 has a coupling 45A which is pivotally mounted onto an ear 45 of a support 46 that in turn is connected to the base 32. The base 32 is connected through a suitable building support or mass with respect to the frame 17 for the roadways, so that the roadways and the restraint system are on a common base or framework.

An outer end pivot pin 49 on the bell crank 37 is at a desired radius relative to the pivot axis on column 36, and is pivotally connected to and supports the weight of a tie bar 53. The tie bar 53, as schematically shown, can be adjusted, extended or retracted in longitudinal axial length. The longitudinal axis of the tie bar 53 is shown at 53A. The tie bar 53 has outer end pivot connections 54 at opposite ends thereof, and it can be seen that the tie bar 53 is positioned between two vertically spaced stringers 38 of the bell crank 37. The bell crank 37 can be reinforced as desired, but the tie bar 53 must be free to pivot relative to an upright pivot axis indicated at 49A. Axis 49A is parallel to the vertical axis passing through the center of gravity of the vehicle, and is perpendicular to the roadway surfaces 18.

It should be noted that the four roadway surfaces 18 form a common plane for most of the operations, but the frame 17 could be raised and lowered if desired, as well as steered.

The tie bar 53 forms part of a four bar linkage that forms the longitudinal restraint. The axis 49A is thus perpendicular to the longitudinal axis of the vehicle which is indicated at 56.

Figures 1, 2:
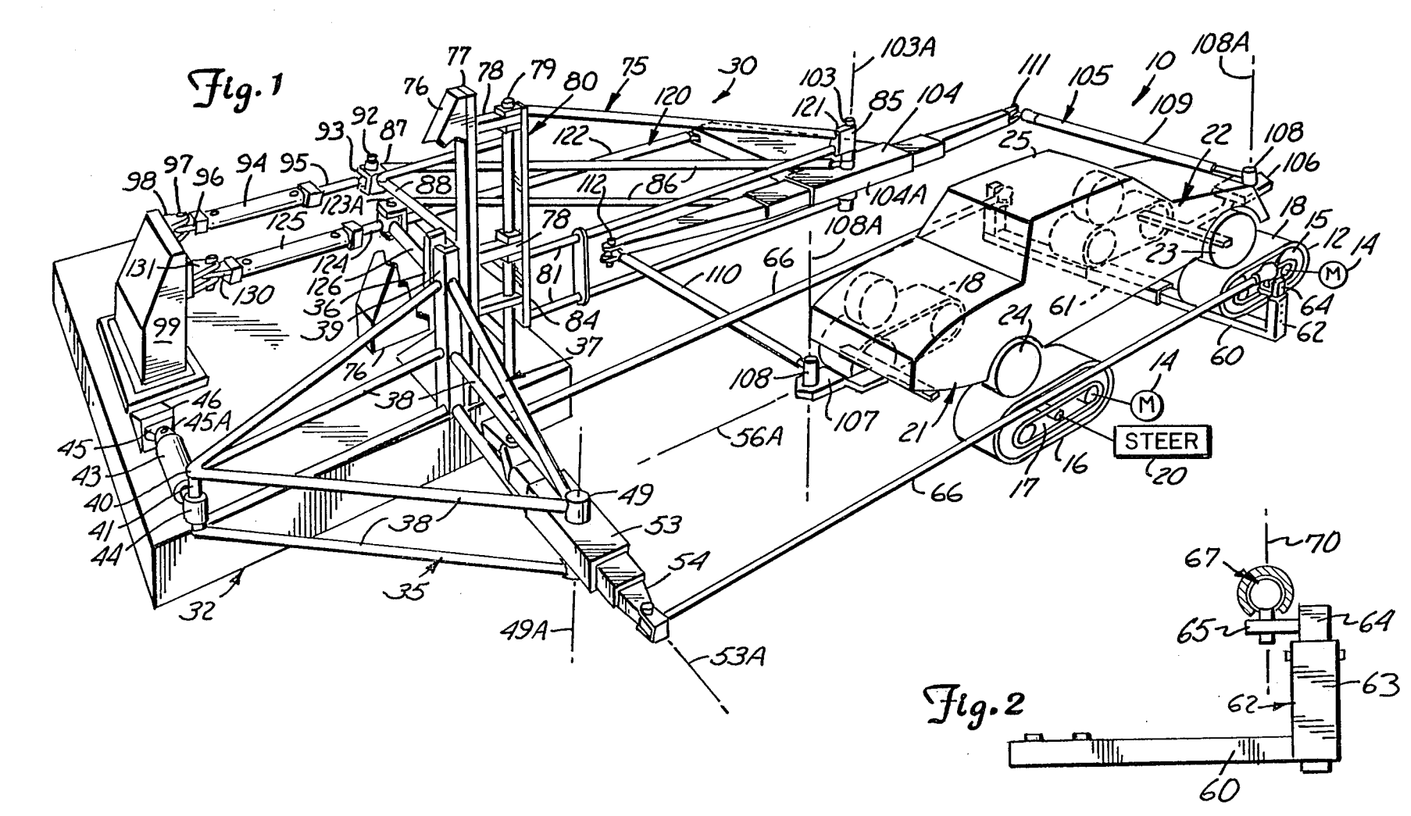
FIG. 1 is a schematic perspective layout of a restraint system made according to the present invention.
FIG. 2 is a schematic rear view of a coupling bracket for the longitudinal restraining linkage.

A second link or bar parallel to the tie bar 53 is represented in FIG. 1 as a vehicle body connecting bar 60 that is coupled to the vehicle body 25 at desired locations. This link or bar 60 is suitably fastened to the body 25 through fastening means such as those shown schematically at 61, and has outer upright end arms 62 that are adjustable in vertical height through the use of a sleeve 63 and an inner member 64 that can be adjusted relative to the sleeve. The inner member 64 on each side of the vehicle has an ear 65 to which a ball joint support 67 is mounted. The ball joint 67 is used for attaching longitudinal load carrying link means 66 on each side of the vehicle.

The pivots for the links 66 are shown as axes 70 that pass through the ball joint pins connected to the ears 65. The plane formed by axes 70 passes through the vehicle center of gravity. The vertical axis through the vehicle center of gravity is midway between the axes 70.

The link means 66 form parallel links with bars 53 and 60. The bars 53 and 60 move in a parallel relationship whenever the tie bar 53 pivots about the axis 49A or whenever the vehicle body pivots about a vertical axis through the vehicle center of gravity.

It can thus be seen that the actuator 43, if under positive hydraulic control, can position the vehicle 22 in fore and aft directions on the roadway surfaces 18 using servo controls. Suitable feedbacks from sensors are used to insure that the vehicle is properly positioned. The sensors could include a displacement sensor or could even include load transducers under the vehicle wheels to insure that the wheels are properly positioned on the roadway surfaces, at least for initial operation. The actuator 43 can be fixed or locked in position and the vehicle then would not move in fore and aft direction, but would be free to move laterally, or move in yaw, because of the linkage arrangement comprising the tie bar 53, the bar 60, and the links 66 which form a parallelogram linkage.

If the actuator 43 is placed under a gas accumulator spring load, and then is permitted to travel from a reference position in either direction to a stop, the vehicle will be free to move fore and aft along its axis 56 against the spring load, up to the desired amount of travel, and is free to do so as the loads change between the roadway 18 and the wheels 23 and 24 of the vehicle. Typical gas springs can be utilized and adjusted as to their spring force or pressure, and also suitable stops can be provided so that the travel of the rod 43A of actuator 43 will be limited or stopped to insure that the wheels 23 and 24 of the vehicle 21 do not go off the roadway surfaces 18.

The lateral and yaw restraint and control linkages are independently operable from each other, but the links mounted onto the same column relative to the base 32. It should be noted that column 36 is moved out of position in FIG. 1 for purposes of illustration, and that the column 36 can be very close to the leading edge of the base 32 and the links 66 could thus be shortened. This is done for convenience of illustration.

A support column or pedestal 76 that is substantially similar to column 36 is fixed to the base 32, and a framework 77 is vertically, adjustably mounted on the pedestal 76. The framework 77 includes outwardly extending arms 78 that mount a pivot shaft 79. Pivot shaft 79 mounts two independent pivoting control linkages. These linkages restrain and control lateral and yaw movements, respectively, and pivot and operate independently, as will be explained. This also can be visualized by looking at FIGS. 3 and 4 where these linkages are shown displaced.

The lateral restraint or control linkage 75 comprises a bell crank 80 that includes a base frame plate 84 mounted on the pivot shaft 79 and supported on the arms 78 of the framework 77 and thus back to the column or pedestal 76. Bell crank 80 includes individual stringers or rails for providing stability, including horizontally extending stringers 81, that are fixed to the base frame plate 84. Stringers 81 extend outwardly from the base frame plate and are fixed to an outer end pivot support 85. Diagonal braces 86 also are part of the bell crank 80, and they extend from the pivot support 85 back to a coupling clevis 87 that is laterally displaced from the pivot shaft 79 by lateral horizontal stringers 88. The clevis 87 connects to a rod end 93 of a lateral actuator 94 with a pivot pin 92.

The lateral actuator 94 is operated in the same manner as actuator 42, and includes an extendible and retractable rod 95, and a cylinder section which has a base end 96 that is mounted with a pivot pin 97 to support ears 98 on a reaction pedestal 99. Thus, upon actuating the rod 95 in and out, the bell crank 80 will move in a direction so that the pivot support 85 will move laterally in and out relative to vehicle 25.

Figure 4:
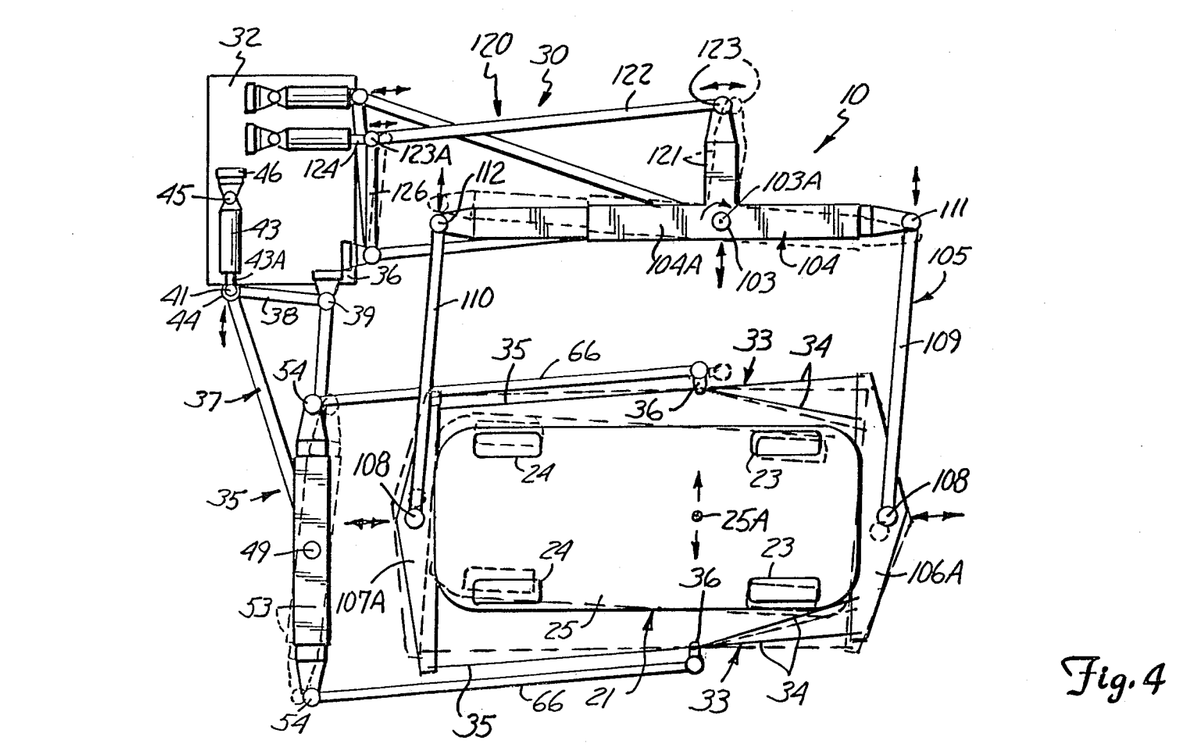
FIG. 4 is a schematic top plan view of a modified form of the invention showing the vehicle in a different restrained position.

FIG. 4 shows the lateral bell crank 80 schematically with the actuator 94 retracted slightly to move the vehicle 25 shown in FIG. 4 from its dotted line position to a solid line position. The vehicle center of gravity has been moved laterally by lateral displacement of the pivot support 85 as the bell crank assembly 80 pivots on pin 79.

The pivot support 85 mounts a pivot shaft 103, which is a vertically extending shaft having an axis 103A that is parallel to the axis 49A as well as to the axis of the pivot pin 79 and the pivot axis for the bell crank 37. This pivot support 85 has an adjustable length control link 104 pivotally mounted thereon. The control link 104 extends in fore and aft direction of the vehicle, and is adjustable in its longitudinal length to accomodate different lengths of vehicles for different test set-ups. The link 104 is part of a four bar or parallel linkage arrangement shown generally at 105 for restraining and controlling the lateral, as well as the yaw movements of the vehicle. This four bar or parallel linkage arrangement 105 includes the vehicle body 25 as one link that acts parallel to the control link 104, and this is done by mounting fixed brackets 106 and 107 at the front and rear of the vehicle 22, respectively. These are fixed to the body so that they are also fixed with respect to the cross link 60. These brackets in turn have front and rear pivot pins 108 mounted thereon which have axes 108A that are parallel to the axes 49A and 103A. Axes 108A lie along a plane that also passes through by the axis 49A and the fore and aft axis 56 of the vehicle 25. The pins 108 are coupled to links 109 and 110, respectively, which have first ends pivotally mounted to the pins 108 and second ends pivotally mounted to pivot connections 111 and 112 at opposite ends of the control link 104. The links 109 and 110 are connected to their respective pivots 108, 111 and 112 trough spherical or universal joints to form the four bar linkage 105.

The yaw restraint and control, that is, the control of the vehicle about an upright axis passing through its center of gravity is achieved with a yaw control four bar linkage 120, which is in part carried by the pivot support 85. The yaw control linkage controls pivoting of the control link 104 about the axis 103A. This is accomplished by having an arm 121 forming one link of four bar linkage 120 fixed to the center portion 104A of the control link 104, so that any movement of the arm 121 will cause rotation of the control link 104 about the axis 103A. The arm 121 is controlled in this movement by a link 122 which is pivotally mounted as at 123 to the, outer end of the arm 121 and which extends back to be pivotally mounted on a pivot pin 123A that passes through a rod end of an actuator rod 124 of a yaw actuator 125. Additionally, the rod end of the rod 124 is supported with a pivoting link assembly 126 that forms part of a four bar linkage 120 and which is pivotally mounted on the vertical pivot pin 79, independent of base plate 84 of the bell crank 80 an completely independent from the bell crank 80. The link 126 extends laterally out from the pin 79. The outer end of link 126, at pin 123, is pivotally mounted independently of the link 122 so the three links of the four bar linkage 120 can parallelogram, while the fourth link, comprising the stringers 81 of the bell crank 80 remains in position determined by actuator 94.

The actuator 125 has a base end 130 which is pivotally connected to suitable ears 131 with a pivot pin to the pedestal 99. The actuator 125 also can be servo controlled as a hydraulic actuator, which when actuated will cause the rod 124 to be extended or retracted, thereby causing the arm 121 and the control link 104 to pivot about the axis 103A. This action is independent of lateral movement of the bell crank 80 and pivot housing 85, although as the pivot housing 85 moves laterally, there will be a slight change in the position of the control link 104 because of the arcuate movement of the pivot axis 103A relative to the pin 123. This can be compensated for by sensing the position of the lateral control actuator 94 and repositioning the actuator 125.

The actuators 94 and 125 can both be under positive servo valve control to position the vehicle in a desired orientation, and the actuators can be selectively changed to be gas springs by connecting accumulators or compressible gas bottles to the opposite ends of the respective actuator so that the piston will move in and out against the loading or resistance of the compressible gas.

In FIG. 4, a slightly modified arrangement for attaching the link is shown. The front and rear brackets 106 and 107 have been replaced by cross yokes 106A and 107A. The yokes 106A and 107A extend laterally beyond the vehicle body sides. The cross bar 60 can then be replaced for connection of links 66 by use of cable assemblies shown at 33 which are arranged as a "bridle" with two cable sections 34 that connect to the front yoke 106A at spaced points and which join a third cable section 35 at a point 86 corresponding to the location of axes 70. The cable assemblies have spherical joints for holding the ends of links 66 to pivot on axes forming a plane passing through the vehicle center of gravity shown at 25A.

Lateral loads cause minimum loads on the links 66 and the bridle arrangement is sufficiently stiff to permit control.

Longitudinal loads are carried as tension in the cable assemblies 33, and this arrangement provides a four bar linkage without the bar 60.

The longitudinal restraint linkage does not cause any restraint in lateral direction or in yaw because the links 53, 60, 66 and 67 parallelogram and do not substantially restrain such movement. Likewise, the parallel linkage formed by the control link 104, and links 109 and 110 at the pivot connections for pins 108 permit fore and aft (longitudinal) movement without substantial restraint. The restraint axes with the present linkage thus are the lateral movement, which can be controlled or restrained, the fore and aft (longitudinal) movement which can be controlled or restrained, and yaw motions, which can be controlled or restrained by the yaw linkage.

The lateral movement control also permits yaw without restraint and by holding the yaw control at a desired location, the permitted motion through link, 104 will only be lateral. When yaw motion occurs, the rear bar or link 53 of the longitudinal restraint linkage will pivot, as will the links 66 and 67, so that there will be no restraint of yaw from the longitudinal linkage.

As stated, any one of the three degrees of restraint can be servo-controlled to be loaded or changed in a desired manner as the test progresses. Stops for limiting the amount of motion are used.

Figure 5:
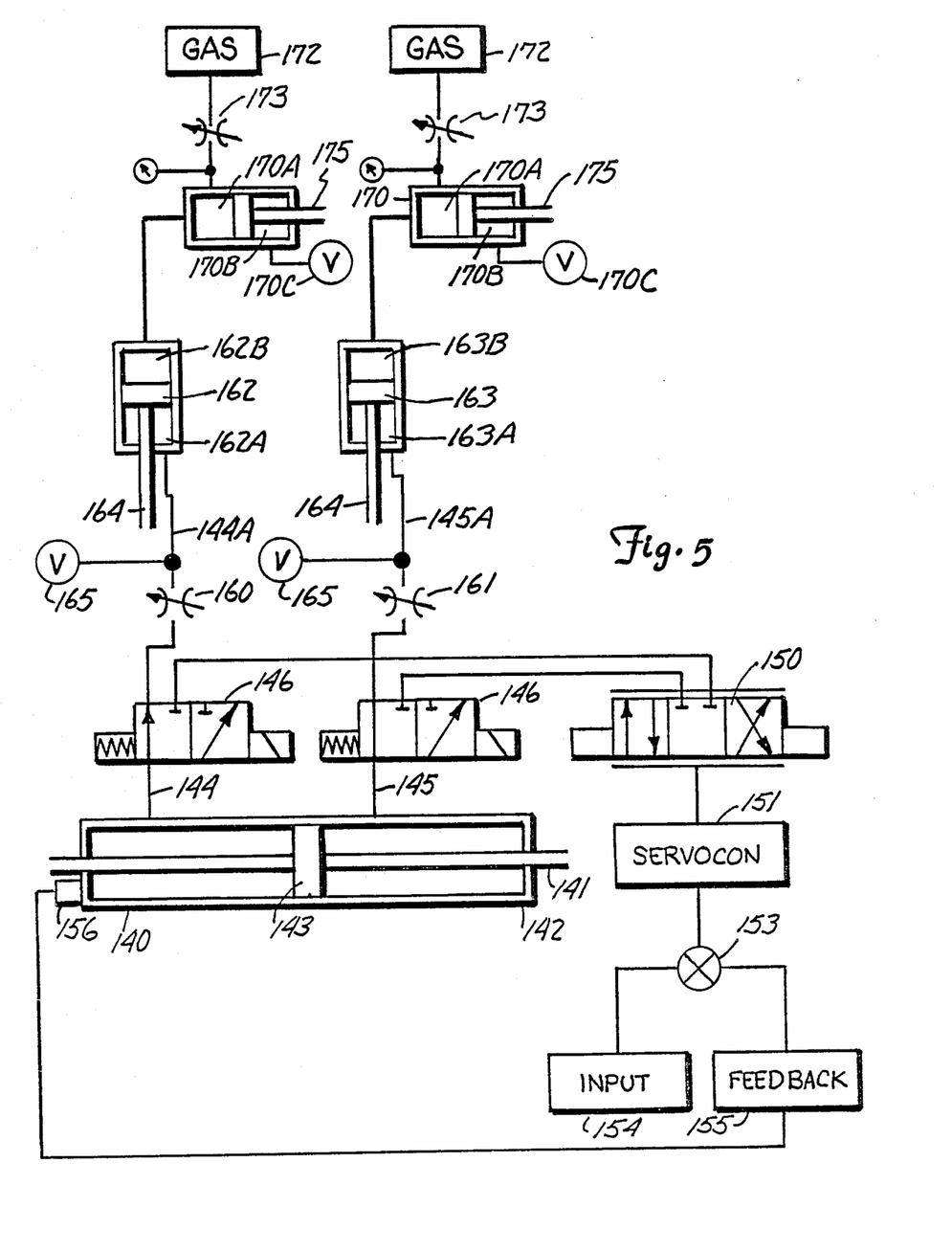
FIG. 5 is a schematic of a hydraulic circuitry used with a restraint cylinder or actuator for the restraint system of the present invention.

FIG. 5 schematically illustrates a typical restraint actuator or cylinder control. In this illustration, an actuator indicated at 140 has a rod 141 and an outer cylinder or housing 142 in which an internal piston 143 is sealingly mounted. The actuator is a conventional hydraulic actuator that can be servocontrolled if desired, and the actuators connected with a line 144 to provide hydraulic fluid to one side of the piston 143. A line 145 is connected to provide hydraulic fluid to the other side of the piston 143. The lines 144 and 145 have selection valves 146 therein. Both selection valves 146 are simultaneously operated. These valves are solenoid valves that will selectively connect the lines 144 and 145 to a servovalve 150, that then is used for controlling the actuator. The servo valve 150 is operated through a servocontroller 151, which in turn receives an error control signal from a summing junction 153 that responds to an input command 154 and a feedback signal 155 in a conventional servocontrol loop. The feedback signal would be displacement, force or the like from a sensor 156 on the actuator 140. The feedback could be provided by other sensors that were directly coupled to the vehicle in a desired manner as well.

The servo control setting of selection valves 146 is for positive control, either dynamic or static, to control the position of the actuator and its associated restraint linkage. When there is hydraulic servo control of the actuator, and the servo valve is preventing flow from either side of the piston 143, the actuator position then would be fixed, and the position of the vehicle in the degree of freedom being controlled by that actuator would then also be fixed. In dynamic control, the servovalve would adjust the actuator piston 143 to achieve the desired forces, accelerations, or positions in response to an input program and a feedback signal.

Additionally, by operating the selection valves 146 to position shown in solid lines, the lines 144 and 145 are connected to line segments 144A and 145A through adjustable flow restrictors 160 and 161, which can be adjustable for dampening, to gas over hydraulic accumulators 162 and 163 that act as gas springs. The accumulators have gas sections 162B and 163B that act on suitable pistons against hydraulic fluid in the hydraulic fluid sections 162A and 163A. Indicator rods 164 can be used for indicating the position of the accumulator pistons that divide the sections 162A from 162B from sections 163A from 163B to provide a signal indicating how much gas volume is in the accumulators, and also the indicator rods 164 can be used to adjust the oil volume automatically by using the signal from the indicator rods 164 to control a fill or makeup valve shown at 168 in each of the lines 144A and 145A.

A gas charge control or makeup chamber arrangement 170 is provided for each of the accumulators 162 and 163. These gas makeup chambers are essentially identical piston actuated accumulators having a gas chamber 170A, and an oil chamber 170B. Chambers 170 are piston carrying actuators where a gas is on one side of a piston and hydraulic oil (a substantially noncompressible fluid) is on the other side of the piston. The oil chambers 170B are used for adjusting the minimum gas volume in the gas chambers 170A through a suitable valve 170C. The gas chambers 170A are adjusted for precharge pressure from gas sources 172 through adjustable gas regulators 173. The stiffness, or resistance to movement, of the associated actuator 140 when it is in its gas spring mode can be changed by adjusting the pressures in the gas chambers 170A and thus, the pressure in accumulator chambers 162B and 163B. The location where the actuator 140 is stopped can be controlled by adjusting the oil volume in the accumulators 162 and 163 because when the respective pistons for the accumulators bottom out against the gas precharge, the piston 143 will be stopped in its desired position to control the maximum travel of the rod 141 in its respective direction of movement. This also controls travel of the linkage that the actuator 140A controls.

The typical actuator 140, and thus the individual control actuators previously shown, can be made passive, adjustable, linear springs by controlling the gas precharge when they are in the gas spring mode. The actuators can be adjustable as to stiffness, and become springs that will change in rate as the piston 143 of the actuator 140 moves in the cylinder 142 by actively controlling the gas pressure while in operation. The actuators also can be made into passive adjustable dampening elements by having relatively low pressure in the gas sections 162B and 163B and controlling the dampening state by adjusting the throttle valves 160 and 161, respectively.

In the passive restraint mode, the individual actuators are isolated from their respective control servo valve and are connected to the two adjustable gas volumes or accumulators.

The spring rate of the actuator at the piston centered position, and the amount of stiffening action, as well as the maximum stroke limit can be adjusted by changing gas pressures and oil volumes in the accumulators and the control chambers for the accumulators. Indicator rods 175 can also be provided on the pistons in the control chambers 170 to aid in controlling the desired stopped position, the effective spring rate, and other control functions of the gas springs.

The amount of stiffening, when an actuator is to be controlled as a non-linear spring, is controlled by adjusting the minimum gas volume through chambers 170. The spring rate of the restraint actuator at its centered position is primarily determined by the precharge gas pressure. This spring rate is adjustable over a range of approximately 15 to 1 by changing the precharge pressure alone.

In the active control mode of the actuators, when the servovalve 150 for each actuator is controlling its respective actuator, the gas volume is disconnected by selection valves 146, and the actuator piston then follows its desired position commands from the input 154. In some instances, it may be desired to hold or fix the vehicle position longitudinally, so that there is a constant longitudinal position while allowing freedom in the lateral and yaw directions. The active restraint allows this to be done by holding the longitudinal actuator fixed. Further, the active restraint mode of control also allows a transient motion to be imposed on a given restrained or controlled axis in order that the effects of an event such as a wind gust from a large passing truck can be studied, because the loads from such a wind gust can be simulated and the movement of the vehicle provided through the servo controls and the actuators for the control linkage.

Because the three restraint linkages are uncoupled from each other, that is, for example, a lateral motion produces no effective yaw or longitudinal motion, each restraint axis may have its restraint cylinder controlled in a mode that is independent of the actuators for the other axes. One axis may be servo controlled, another one might be passive with a low spring rate, and a third one might be a passive spring with a very high spring rate or a non-linear spring rate. The forces produced along or about each of the restraint axes are available for direct measurement using suitable pressure transducers in the actuators, with no need for coordinate conversion or compensation. This system provides for a realistic experience for the driver, the vehicle power train, and/or the vehicle suspension.

So long as the vehicle is acting within the longitudinal, lateral and yaw limits of the roadway surface 18, the vehicle will move on these roadway surfaces in a way similar to that of an actual road.

There is a limit in the amount of low frequency acceleration that can be provided with any test system using simulated roadways. On a road, the vehicle has an arbitrarily large space within which to move and experience very low frequency, or even zero frequency, acceleration. The roadway surfaces 18 have a much smaller space available. However, if one correlates the action of the present restraint system to that of a high pass filter on vehicle accelerations, it can be shown that within the displacement limits of the roadway, vehicle accelerations for a period of approximately one second or less may be achieved before the limits of travel are encountered. Long period accelerations are limited by the finite roadway displacement limits of the roadway surfaces 18, and the restraint system as well, so that a driver and any objects within a vehicle will not experience accelerations with a period greater than approximately one second.

Vehicle power trains, chassis and suspension may still experience loads of arbitrarily long periods with appropriate programming of the drive motors for the roadway belts, and the roadway yaw control system. An example is that the steady state cornering forces found in a suspension while a vehicle is turning at a constant radius of speed will be reacted through the restraint system by focusing the roadways to a turning radius determined by the measured lateral force, the vehicle mass, and the vehicle forward speed. This helps to simulate the cornering forces.

It was stated that only a small fraction of the restraint system mass is reacted to vehicles, and the reacted mass is principally that of the links that extend from the vehicle and form part of the lateral and the longitudinal control links, and the longitudinal and lateral attachment members that are coupled to the vehicle.

The restraint system can be adjusted vertically to coincide with the vertical position or height of the vehicle's center of gravity.

Movement of the restraint system horizontally on the test facility floor is not required since the present restraint system is made so that the vehicle center of gravity is constant relative to the test facility floor at the centered position of the restraint. The roadways may be moved along the support floor to position the roadways underneath the wheels of the vehicle after the vehicle has been properly positioned with the linkage centered.

The device provides compact, accurate, and reliable restraints for testing vehicles on simulated test facility roadways.

Although the present invention has been described with reference to preferred embodiments, workers skilled in the art will recognize that changes may be made in form and detail without departing from the spirit and scope of the invention.

What is claimed is:

1. For use in combination with a test facility having a simulated roadway on which a vehicle is mounted, said vehicle having a center of gravity and a longitudinal axis and a transverse axis passing through the center of gravity, which roadway comprises means for simulating vehicle travel while the vehicle is restrained in space, the improvement comprising a restraint system including: at least first and second link means for
 controlling movement of the vehicle in opposite directions along its longitudinal axis and its transverse axis, said separate link means each having one link controlled in direction along the axis being controlled thereby, and a plurality of other links pivoted together for permitting the vehicle to move along one of the axes to change positions of the vehicle in space without substantially changing the link means controlling the other axis.

2. The combination as specified in claim 1 and actuator means for independently controlling the one link of each of said link means for positioning the one link in direction along the axis to be controlled.

3. The combination as specified in claim 2 wherein said link means comprise four bar linkages pivoted to permit parallelogram movement of the links.

4. The combination as specified in claim 2, and valve means to selectively permit servocontrol of said actuator means to positively control the position of the respective one link of the link means.

5. The combination as specified in claim 2 wherin the one link of the link means used for controlling movement along the transverse axis of the vehicle is on the exterior of said vehicle and is oriented generally parallel to the vehicle longitudinal axis, and third link means for controlling movement of said one link of the transverse axis link means about a third axis perpendicular to the plane defined by the longitudinal and transverse axes of the vehicle and upon pivoting movement of said one link of the transverse axis link means about the third axis causing the vehicle to rotate about a yaw axis parallel to the third axis and passing through a center of gravity of the vehicle.

6. The combination as specified in claim 1 wherein said simulated roadway comprises individual belt members operated at a desired lineal speed of travel, said belt members having roadway surfaces defining a plane on which the vehicle rests, and wherein the one link of the first link means is used for restraining movement in birection along the vehicle longitudinal axis and comprises a longitudinal axis control link to the exterior of the vehicle, said first link means including a pair of side links pivotally mounted on first axes to opposite sides of the vehicle, the side links having remote ends pivotally mounted with respect to the vehicle about second link axes parallel to the first axes, a first line between the first axes on the control link being positioned parallel to a second line between the second link axes, said second line between the second link axes passing through the center of gravity of the vehicle and extending substantially perpendicular to the longitudinal axis of the vehicle, and the first axes and the second link axes being parallel.

7. The apparatus as specified in claim 3 wherein said one link of the first and second four bar linkages comprise control links that are on the exterior of a vehicle to be tested, a first of said control links being substantially perpendicular to the vehicle longitudinal axis, and a second of the control links being substantially parallel to the longitudinal axis of the vehicle, said control links each having means theron defining force input axes that are generally parallel to each other and perpendicular to a support plane of a vehicle being tested, and independent means for controlling the force reacted at the force input axes at the repective control links.

8. The apparatus as specified in claim 7 wherein said independent means comprise bell crank means having bell crank pivot axes for the respective bell crank means that are spaced from each other, and independent actuators for controlling pivoting of the respective bell crank means about the respective bell crank axes, said bell crank means each having a pivot connection to the respective force input axes of the respective control links.

9. The apparatus as specified in claim 8 and control means for said actuators comprising gas springs selectively coupled to each of the inputs of the actuators, and selectively coupled servovalve means for controlling the positions of the actuators relative to the respective control links.

* * * * *

UNITED STATES PATENT AND TRADEMARK OFFICE
CERTIFICATE OF CORRECTION

PATENT NO. : 4,862,737
DATED : September 5, 1989
INVENTOR(S) : William J. Langer It is certified that error appears in the above-identified patent and that said Letters Patent is hereby corrected as shown below:

Column 12, line 28, delete "birection" and insert therefore --direction--.

Column 12, line 53, delete "repective", and insert therfore --respective--.

Signed and Sealed this

Seventh Day of August, 1990

Attest:

HARRY F. MANBECK, JR.

*Attesting Officer*    *Commissioner of Patents and Trademarks*